United States Patent
Grozis

(10) Patent No.: US 8,243,787 B2
(45) Date of Patent: Aug. 14, 2012

(54) METHOD AND SYSTEM FOR PROTECTING MPEG FRAMES DURING TRANSMISSION WITHIN AN INTERNET PROTOCOL (IP) NETWORK

(75) Inventor: Kevin D. Grozis, Sterling, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1093 days.

(21) Appl. No.: 12/140,409

(22) Filed: Jun. 17, 2008

(65) Prior Publication Data

US 2009/0313673 A1    Dec. 17, 2009

(51) Int. Cl.
*H04N 7/12* (2006.01)
*H04N 11/02* (2006.01)
*H04N 11/04* (2006.01)

(52) U.S. Cl. .......... 375/240.01; 375/240.12; 375/240.13

(58) Field of Classification Search ........... 375/240–241
See application file for complete search history.

(56) References Cited

U.S. PATENT DOCUMENTS

| | | | | |
|---|---|---|---|---|
| 7,155,215 | B1* | 12/2006 | Miernik et al. | 455/423 |
| 8,009,567 | B2* | 8/2011 | Dattagupta et al. | 370/235 |
| 2003/0081613 | A1* | 5/2003 | Yamanaka | 370/395.21 |
| 2004/0136379 | A1* | 7/2004 | Liao et al. | 370/395.21 |
| 2005/0243853 | A1* | 11/2005 | Bitar et al. | 370/432 |
| 2006/0168133 | A1* | 7/2006 | Park et al. | 709/219 |
| 2007/0220404 | A1* | 9/2007 | Terui et al. | 714/774 |
| 2009/0313673 | A1* | 12/2009 | Grozis | 725/118 |

* cited by examiner

*Primary Examiner* — Andrew Chriss
*Assistant Examiner* — Benjamin H Elliott, IV

(57) ABSTRACT

A system and method in accordance with exemplary embodiments may include identifying video data traffic as at least one of I-frame video data traffic, B-frame video data traffic, and P-frame video data traffic, classifying the video data traffic based on the identification, applying at least one of Expedited Forwarding (EF) standards and Assured Forwarding (AF) standards to the video data traffic based on the classification, and transmitting the video data traffic to one or more video receiver device network elements via one or more network elements using a network.

20 Claims, 5 Drawing Sheets

METHOD AND SYSTEM FOR PROTECTING MPEG FRAMES DURING TRANSMISSION WITHIN AN INTERNET PROTOCOL (IP) NETWORK

BACKGROUND INFORMATION

Motion Picture Experts Group (MPEG) video data traffic may be transmitted from a video source to one or more end user video receivers over an Internet Protocol (IP) network to provide Internet Protocol television (IPtv) services and/or Video-On-Demand (VOD) services. In many instances, the video data traffic may be transmitted across the IP network as best effort data. Best effort data, however, may include data traffic that is likely to be dropped from the IP network during times of network congestion. Since IPtv services and/or VOD services may provide real-time video streaming, IPtv service providers and/or VOD service providers may desire a more reliable method of transmitting MPEG video data traffic to one or more end user video receivers over an IP network.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which.

These and other embodiments and advantages will become apparent from the following detailed description, taken in conjunction with the accompanying drawings, illustrating by way of example the principles of the various exemplary embodiments.

DETAILED DESCRIPTION OF EXEMPLARY EMBODIMENTS

The description below describes elements of a communications network that may include one or more modules, some of which are explicitly shown in the figures, others that are not. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another Additionally, the modules may be moved from one device and added to another device, and/or may be included in both devices.

The description below also describes physical and logical elements of a communications network, some of which are explicitly shown in figures, others that are not. The inclusion of some physical elements of a network system may help illustrate how a given network may be modeled. It should be noted, however, that all illustrations are purely exemplary and that the MPEG protection scheme described herein may be performed on different varieties of networks which may include different physical and logical elements.

Figure 1:
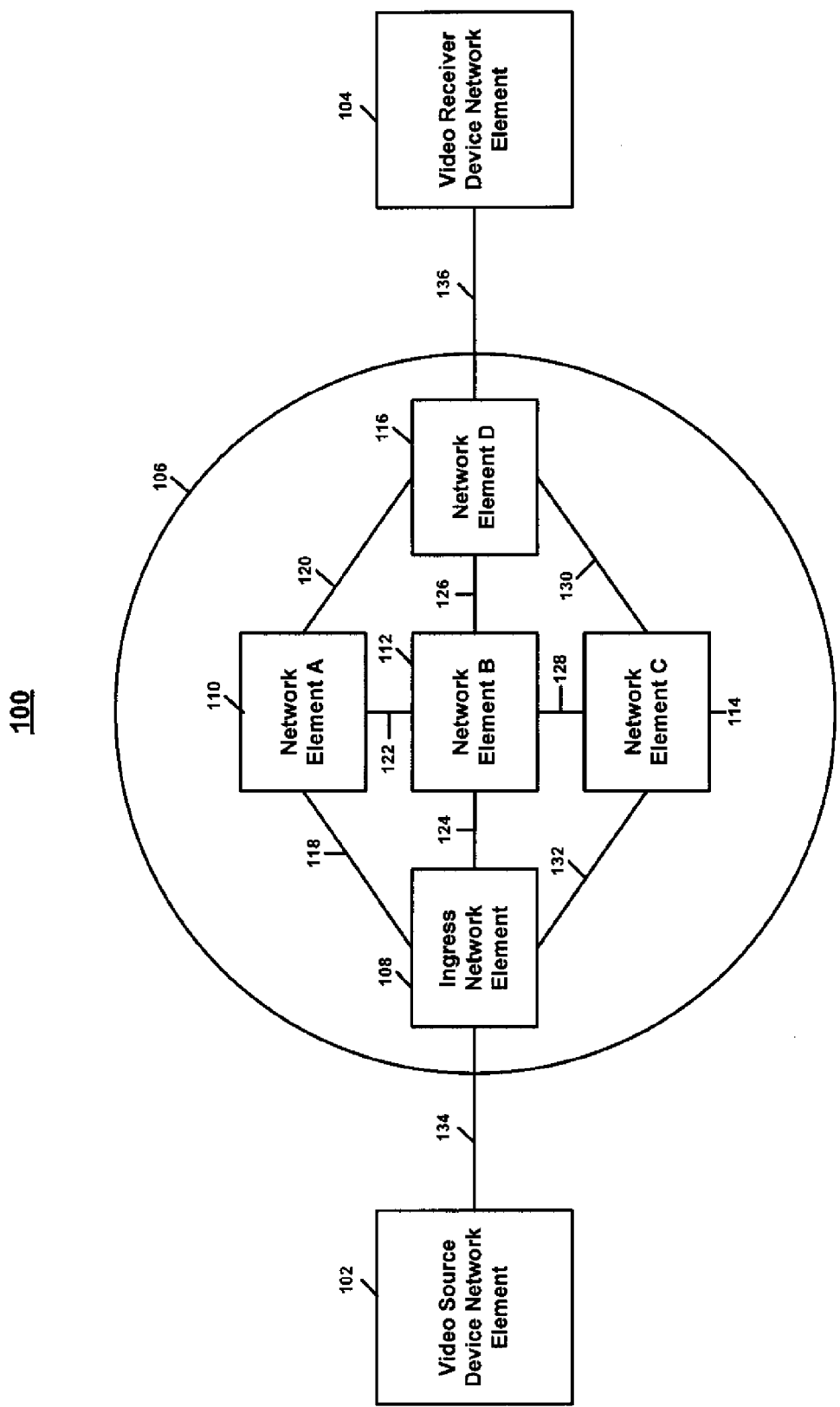
FIG. 1 illustrates a block diagram of a topology of a network for protecting video data traffic during transmission within an IP network in accordance with exemplary embodiments.

For instance, network 100 from FIG. 1 illustrates a simplified view of a communications network and various elements in the communications network. It is noted that other hardware and software not depicted may be included in network 100. It is also noted that network 100 illustrates a specific number of instances of a video source device network element 102, an ingress network element 108, a network element A 110, a network element B 116, a network element C 114, a network element D 112, a video receiver device network element 104, and an IP network 106. It will be appreciated that a single instance and/or multiple instances of these entities may be included in a network.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof.

In various embodiments, Expedited Forwarding (EF) may include a per-hop forwarding behavior (PHB) that causes network elements to treat data traffic classified as EF data traffic in a manner that ensures a low-loss, low jitter, and/or assured bandwidth quality of service from end-to-end of a network. In various embodiments, Assured Forwarding (AF) may include a PHB that causes network elements to treat data traffic classified as AF data traffic in a manner that ensures an assured bandwidth quality of service from end-to-end of a network. Accordingly, an EF PHB and/or an AF PHB may be used to protect real-time Motion Picture Experts Group (MPEG) video data traffic during times of network congestion.

In various embodiments, MPEG video data traffic may include Intra-coded (I) frame video data traffic, Bi-directional predicted (B) frame video data traffic, Predicted (P) frame video data traffic, and/or any other video information that may viewed using a display device. I-frame video data traffic may include one or more reference I-frames that may be used as a reference to decode one or more B-frames and/or one or more P-frames. B-frame video data traffic may include one or more B-frames that may depend on one or more I-frames to be decoded. P-frame video data traffic may include one or more P-frames that may depend on one or more I-frames to be decoded. Accordingly, the I-frame video data traffic may be associated with a greater priority to protect in the event of a network drop than the B-frame video data traffic and/or the P-frame video data traffic.

One or more network elements associated with one or more networks may be configured to protect MPEG video data traffic. In various embodiments, one or more networks elements may be configured to treat I-frame video data traffic as EF video data traffic. Accordingly, one or more network elements may transmit the I-frame video data traffic in a manner that ensures a low-loss, low-jitter, and/or assured bandwidth quality of service from end-to-end within a network. In addition, one or more network elements may be configured to treat B-frame video data traffic and/or P-frame video data traffic as AF video data traffic. Accordingly, one or more network elements may transmit the B-frame video data traffic and/or P-frame video data traffic in manner that ensures an assured bandwidth quality of service from end-to-end within a network.

A MPEG video data traffic protection system may include a video source device network element that is communicatively coupled to an Internet Protocol (IP) network that is configured to provide Internet Protocol television (IPtv) service to one or more end user receiver network elements. In various embodiments, the video source device network element may be configured to classify I-frame video data traffic as EF video data traffic. In various embodiments, the video source device network element may be configured to classify B-frame video data traffic and/or P-frame video data traffic as AF video data traffic.

A MPEG video data traffic protection system may include an ingress network element that is communicatively coupled to an Internet Protocol (IP) network that is configured to provide Internet Protocol television (IPtv) service to one or more end user receiver network elements. In various embodiments, the ingress network element may be configured to identify video data traffic as I-frame data traffic, B-frame data traffic and/or P-frame data traffic. Identifying the video data traffic may include accessing the frame type of the video data traffic using an inspection mechanism (e.g., Deep Packet Inspection). In various embodiments, the ingress network element may be configured to classify I-frame video data traffic as EF video data traffic. In various embodiments, the ingress network element may be configured to classify B-frame video data traffic and/or P-frame video data traffic as AF video data traffic.

The MPEG video data traffic protection system may configure one or more network elements communicatively coupled to the IP network to treat the I-frame video data traffic as EF video data traffic and treat the B-frame video data traffic and/or P-frame video data traffic as AF video data traffic.

FIG. 1 illustrates a block diagram of a topology of a network 100 for protecting video data traffic during transmission within an IP network 106 in accordance with exemplary embodiments. Network 100 may include one or more network elements that are configured to protect video data traffic during transmission within an IP network 106. In particular, network 100 may include a video source device network element 102 that is communicatively coupled to the IP network 106 via data path 134 and a video receiver device network element 104 that is communicatively coupled to the IP network 106 via data path 136.

The IP network 106 may include an analog telephone network, a digital telephone network, a cellular telephone network, a public wide area network ("WAN"), such as the Internet, or, different connections, such as combinations of public and private WANs, local areas networks ("LANs"), wireless LANs, encrypted networks, body area networks, or other wired or wireless networks capable of communicating video data traffic to and/or from one or more elements of the network 100. In an exemplary embodiment, the IP network 106 may include one or more networks operating as a stand-alone network or in cooperation with each other. Use of the term network herein is not intended to limit the network to a single network.

The IP network 106 may include one or more network elements. For example, the one or more network elements of the IP network 106 may include an ingress network element 108, a network element A 110, a network element B 112, a network element C 114, and/or a network element D 116. In an exemplary embodiment, one or more network elements 102, 108, 110, 112, 114, and 116 may include one or more routers and/or any other device that may be used to forward data along a data path in a network.

As illustrated, the IP network 106 may communicatively couple an ingress network element 108 to a video source device network element 102 via data path 134. The IP network 106 may also couple the ingress network element 108 to network element A 110, network element B 112, and/or network element C 114 via data path 118, data path 124, and data path 132, respectively. The network element A 110 may be coupled to the network element D 116 via data path 120 and the network element B 112 via data path 122. The network element B 112 may be coupled to the network element D 116 via data path 126 and the network element C 114 via data path 128. The network element C 114 may be coupled to the network element D 116 via data path 130. The IP network 106 may couple the network element D 116 to the video receiver device network element 104 via data path 136. In various embodiments, multiple data paths may be used by the video data traffic for redundancy purposes.

In an exemplary embodiment, the video source device network element 102 may be associated with the downstream portion of network 100. The video receiver device network element 104 may be associated with the upstream portion of network 100. Accordingly, video data traffic originating from the video source device network element 102 may be configured to flow from the downstream portion of network 100 to the upstream portion of network 100. As used herein, the phrase "video data traffic" is used to refer to a packet, datagram, frame, message, segment, or any other logical information associated with MPEG video data that is conveyed via a network.

In an exemplary embodiment, the video source device network element 102 may include software and/or hardware configured to generate and/or encode video data traffic. The video source device network element 102 may be configured to classify I-frame video data traffic as EF video data traffic and/or classify B-frame video data traffic and/or P-frame video data traffic as AF video data traffic. The video source device network element 102 may transmit the video data traffic to the upstream portion of the IP network 106 and/or the ingress network element 108 via data path 134. The video source device network element 102 may include, but is not limited to, a computer device or communications device including, e.g., a personal computer (PC), a workstation, a thin system, a fat system, network appliance, an Internet browser, a server, and/or any other device that is capable of generating, encoding, and/or transmitting video data traffic. The video source device network element 102 is discussed in further detail below with reference to FIG. 2.

In an exemplary embodiment, the ingress network element 108 may include software and/or hardware configured to receive video data traffic from the video source device network element 102 via data path 134 and/or transmit the video data traffic to the upstream portion of the IP network 106 via data path 118, data path 124, and/or data path 132. In various embodiments, the ingress network element 108 may be configured to identify video data traffic as one of I-frame video data traffic, B-frame video data traffic, P-frame video data traffic, and/or a combination thereof using an inspection mechanism (discussed in further detail below). The ingress network element 108 may be configured to classify I-frame video data traffic as EF video data traffic and/or classify B-frame video data traffic and/or P-frame video data traffic as AF video data traffic. The ingress network element 108 may be configured to treat video data traffic classified as EF video data traffic in a manner that ensures a low-loss, low-jitter, and/or assured bandwidth quality of service during transmission within the ingress network element 108. The ingress network element 108 may be configured to treat video data traffic classified as AF video data traffic in a manner that ensures an assured bandwidth quality of service during transmission with the ingress network element 108. The ingress network element 108 may include, but is not limited to, a computer device or communications device including, e.g., a network appliance, a router, a gateway, a switch, and/or any other device that is capable of receiving, identifying, classifying, and/or transmitting video data traffic. The ingress network element 102 is discussed in further detail below with reference to FIG. 3.

In an exemplary embodiment, the network element A 110, the network element B 112, the network element C 114, and/or the network element D 116 may include software and/or hardware configured to receive video data traffic via one or more data paths associated with the IP network 106 and/or transmit video data traffic via one or more data paths associated with the IP network 106. In various embodiments, the network element A 110, the network element B 112, the network element C 114, and/or the network element D 116 may be configured to identify video data traffic as one of I-frame video data traffic, B-frame video data traffic, P-frame video data traffic, and/or a combination thereof using an inspection mechanism (discussed in further detail below). The network element A 110, the network element B 112, the network element C 114, and/or the network element D 116 may be configured to classify I-frame video data traffic as EF video data traffic and/or classify B-frame video data traffic and/or P-frame video data traffic as AF video data traffic. The network element A 110, the network element B 112, the network element C 114, and/or the network element D 116 may be configured to treat video data traffic classified as EF video data traffic in a manner that ensures a low-loss, low-jitter, and/or assured bandwidth quality of service during transmission within the network elements, respectively. The network element A 110, the network element B 112, the network element C 114, and/or the network element D 116 may be configured to treat video data traffic classified as AF video data traffic in a manner that ensures an assured bandwidth quality of service during transmission with the network elements, respectively. The network element A 110, the network element B 112, the network element C 114, and/or the network element D 116 may include, but are not limited to, a computer device or communications device including, e.g., a network appliance, a router, a gateway, a switch, and/or any other device that is capable of receiving, identifying, classifying, and/or transmitting video data traffic.

In various embodiments, treating video data traffic associated with one or more network elements as EF video data traffic may include statically configuring the quality of service associated with one or more network elements to apply EF PHB standards to the EF video data traffic during transmission. In various embodiments, treating video data traffic associated with one or more network elements as AF video data traffic may include statically configuring the quality of service associated with one or more network elements to apply AF PHB standards to the AF video data traffic during transmission.

In various embodiments, treating video data traffic associated with one or more network elements as EF video data traffic may include dynamically configuring the quality of service associated with one or more network elements to apply EF PHB standards to the EF video data traffic prior to transmitting the EF video data traffic to one or more network elements. In various embodiments, treating video data traffic associated with one or more network elements as AF video data traffic may include dynamically configuring the quality of service associated with one or more network elements to apply AF PHB standards to the AF video data traffic prior to transmitting the AF video data traffic to one or more network elements. In an exemplary embodiment, dynamically configuring the quality of service associated with one or more network elements to apply EF PHB standards to the EF video data traffic and/or apply AF PUB standards to the AF video data traffic may include using a policy management network element (not shown) that is configured to transmit (e.g., push) the configuration to one or more network elements via the IP network 106.

Applying EF PHB standards may include using a strict priority queue such that the EF video data traffic (e.g., I-frame video data traffic) is prevented from being dropped from a network element during times of network congestion. Applying AF PHB standards may include using an assured bandwidth such that the AF video data traffic (e.g., B-frame video data traffic, P-frame video data traffic) is associated with a greater priority than best effort data, but may be dropped in times of extreme network congestion. On egress, AF video data traffic may be associated with a user-defined bandwidth. In various embodiments, a user-defined bandwidth may include an amount of bandwidth that is greater than or less than the amount of bandwidth associated with best effort data. In various embodiments, best effort data traffic may be associated with an amount of egress bandwidth that remains after an allocation of bandwidth associated with EF video data traffic and/or AF video data traffic.

In various embodiments, the previously described functionality may be associated with a packet switched network. A packet switched network may include a network in which one or more packets (e.g., data traffic) may be may be routed between one or more nodes (e.g., network elements) of the network, where the one or more packets may be queued and/or buffered within each node, which may result in a variable delay.

In various embodiments, IP network 106 may be configured to function as a circuit switched network. A circuit switched network may include a network in which one or more fixed bandwidth circuits (e.g., channels) may be determined between one or more nodes and/or terminals prior to transmitting one or more packets across the network. In various embodiments, a circuit switched network may be defined during an initiation period (e.g., call set-up) at one or more ingress nodes and/or egress nodes such that one or more data paths associated with guaranteed bandwidth may be established throughout the circuit switched network. In the circuit switched network, one or more policy management network elements may configure one or more nodes (e.g., network elements) to adjust a quality of service to transmit data traffic. In various embodiments, the one or more policy management network elements may identify which nodes are congested and may route data traffic around the congested nodes and/or may re-configure one or more quality of services associated with the congested nodes to transmit one or more data traffic flows and/or drop one or more other data traffic flows.

In various embodiments, a resource reservation protocol (RSVP) may be used to configure an IP network 106 to operate as a circuit switched network. An RSVP may access one or more routing protocols associated with the IP network 106 to determine the best data path for data traffic. The RSVP may transmit one or more bandwidth requirements to one or more nodes (e.g., network elements) associated with the data traffic to reserve bandwidth for the data traffic.

In an exemplary embodiment, the video receiver device network element 104 may include software and/or hardware configured to receive video data traffic from the network element D 116 and/or the IP network 106 via data path 136. The video receiver device network element 104 may be associated with one or more customer sites. The video receiver device network element 104 may include, but is not limited to, a computer device or communications device including, e.g., a personal computer (PC), a workstation, a thin system, a fat system, network appliance, an Internet browser, a server, a set top box, and/or any other device that is capable of receiving video data traffic.

Figure 2:
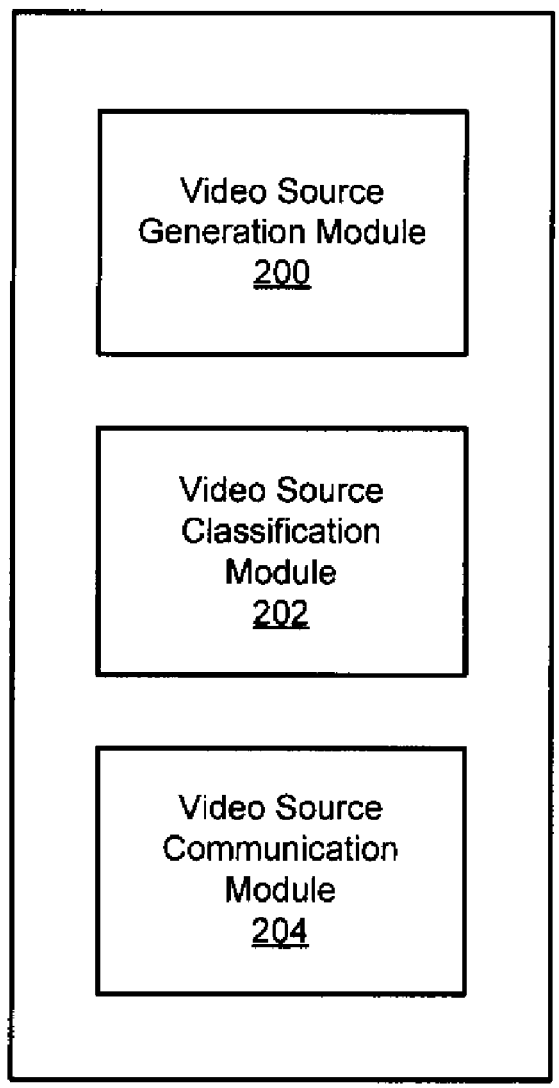
FIG. 2 illustrates exemplary modules of a video source device network element in accordance with exemplary embodiments.

FIG. 2 illustrates exemplary modules of a video source device network element 102 in accordance with exemplary embodiments. In an exemplary embodiment, the video source device network element 102 may include a video source generation module 200, a video source classification module 202, and a video source communication module 204. It is noted that the modules 200, 202, and 204 are exemplary. The functions of the modules 200, 202, and 204 may be performed at other modules remote or local to the video source device network element 102, and the modules 200, 202, and 204 may be combined and/or separated. It is also noted that the modules 200, 202, and 204 may be included in any other network element associated with the network 100.

The video source generation module 200 may include software and/or hardware configured to receive and/or generate video data traffic. In various embodiments, the video source generation module 200 may be configured to encode video data traffic using MPEG encoding standards that are well-known in the art.

The video source classification module 202 may include software and/or hardware configured to classify the video data traffic. Based on the type of frame encoded by the video source generation module 200, the video data traffic may be classified as EF video data traffic and/or AF video data traffic. For example, the video source classification module 202 may classify I-frame video data traffic as EF video data traffic. In addition, the video source classification module 202 may classify B-frame video data traffic and/or P-frame video data traffic as AF video data traffic.

In various embodiments, classifying video data traffic may include accessing and/or modifying one or more bits associated with the quality of service (e.g., type of service) in the header portion of the video data traffic. Quality of service may include a description of the type of priority associated with the video data traffic. For example, the bit stream '11111111' may be associated with an EF PHB quality of service, while the bit stream '00000000' may be associated with an AF PHB quality of service. Accordingly, the video source classification module 202 may access and/or modify the one or more bits associated with the quality of service in the header portion of I-frame video data traffic such that the bits read '11111111', indicating the EF PHB quality of service. In addition, the video source classification module 202 may access and/or modify the one or more bits associated with the quality of service in the header portion of B-frame video data traffic and/or P-frame video data traffic such that the bits read '00000000', indicating the AF PHB quality of service.

The video source communication module 204 may include software and/or hardware configured to transmit the video data traffic to upstream portion of the network 100. Accordingly, the video source communication module 204 may be configured to transmit the video data traffic to the ingress network element 108 and/or the IP network 106 via data path 134.

Figure 3:
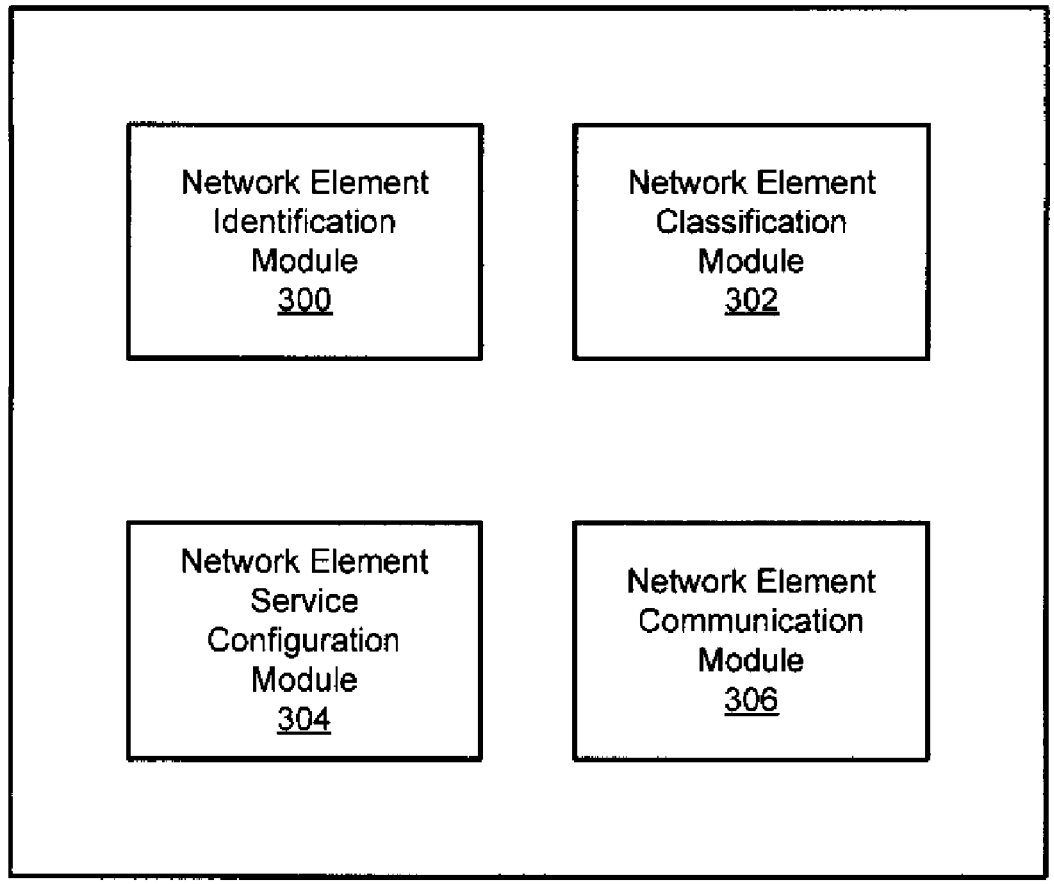
FIG. 3 illustrates exemplary modules of an ingress network element in accordance with exemplary embodiments.

FIG. 3 illustrates exemplary modules of an ingress network element 108 in accordance with exemplary embodiments. In an exemplary embodiment, the ingress network element 108 may include a network element identification module 300, a network element classification module 302, a network element service configuration module 304, and a network element communication module 306. It is noted that the modules 300, 302, 304, and 306 are exemplary. The functions of the modules 300, 302, 304, and 306 may be performed at other modules remote or local to the ingress network element 108, and the modules 300, 302, 304, and 306 may be combined and/or separated. It is also noted that the modules 300, 302, 304, and 306 may be included in any other network element associated with the network 100.

The network element identification module 300 may include software and/or hardware configured to identify the type of frame of the video data traffic received at the ingress network element 108. In various embodiments, the network element identification module 300 may use software (e.g., Deep Packet Inspection) and/or hardware to access one or more fields associated with the video data traffic to identify the type of frame associated with the video data traffic. A field may include one or more bits associated with the header portion and/or the payload portion of video data traffic. For example, the network element identification module 300 may use DPI to identify video data traffic as one of I-frame video data traffic, B-frame video data traffic, P-frame video data traffic, and/or a combination thereof.

The network element classification module 302 may include software and/or hardware configured to classify the video data traffic. Based on the type of frame identified by the network element identification module 300, the video data traffic may be classified as EF video data traffic and/or AF video data traffic. For example, the network element classification module 302 may classify I-frame video data traffic as EF video data traffic. In addition, the network element classification module 302 may classify B-frame video data traffic and/or P-frame video data traffic as AF video data traffic.

As previously discussed, classifying video data traffic may include accessing and/or modifying one or more bits associated with the quality of service (e.g., type of service) in the header portion of the video data traffic. For example, the bit stream '11111111' may be associated with an EF PHB quality of service, while the bit stream '00000000' may be associated with an AF PHB quality of service. Accordingly, the network element classification module 302 may access and/or modify one or more bits associated with the quality of service in the header portion of I-frame video data traffic such that the bits read '11111111', indicating the EF PHB quality of service. In addition, the network element classification module 302 may access and/or modify one or more bits associated with the quality of service in the header portion of B-frame video data traffic and/or P-frame video data traffic such that the bits read '00000000', indicating the AF PHB quality of service.

The network element service configuration module 304 may include software and/or hardware configured to store and/or apply EF PHB standards to I-frame video traffic data and/or AF PHB standards to B-frame video traffic data and/or P-frame video traffic data. In various embodiments, the network element service configuration module 304 may be statically configured such that the quality of service associated with the ingress network element 108 may apply EF PHB standards and/or AF PHB standards properly. In various embodiments, the network element service configuration module 304 may be dynamically configured such that the quality of service associated with the ingress network element 108 may apply EF PHB standards and/or AF PHB standards properly. In an exemplary embodiment, the network element configuration module 304 may receive configuration information from a policy management network element (not shown).

The network element communication module 306 may include software and/or hardware configured to receive video data traffic from one or more network elements of the IP network 106 associated with downstream portion of network 100. In various embodiments, the network element communication module 306 may include software and/or hardware configured to transmit the video data traffic to the upstream portion of the IP network 106. Accordingly, the network element communication module 306 may be configured to transmit the video data traffic to one or more network elements of the IP network 106 associated with the upstream portion of network 100.

It should be noted that the functions of the modules described in FIG. 3 may be performed at one or more network elements not associated with the ingress point of the IP network 106. Accordingly, the network element A 110, the network element B 112, the network element C 114, and/or the network element D 116 may perform the functions of the modules described in FIG. 3. It should also be noted that performing the functions of the modules described in FIG. 3 at a network element not associated with the ingress point of the IP network 106 may not be optimal since the video data traffic would not be treated as EF video data traffic and AF video data traffic from end-to end.

Figure 4:
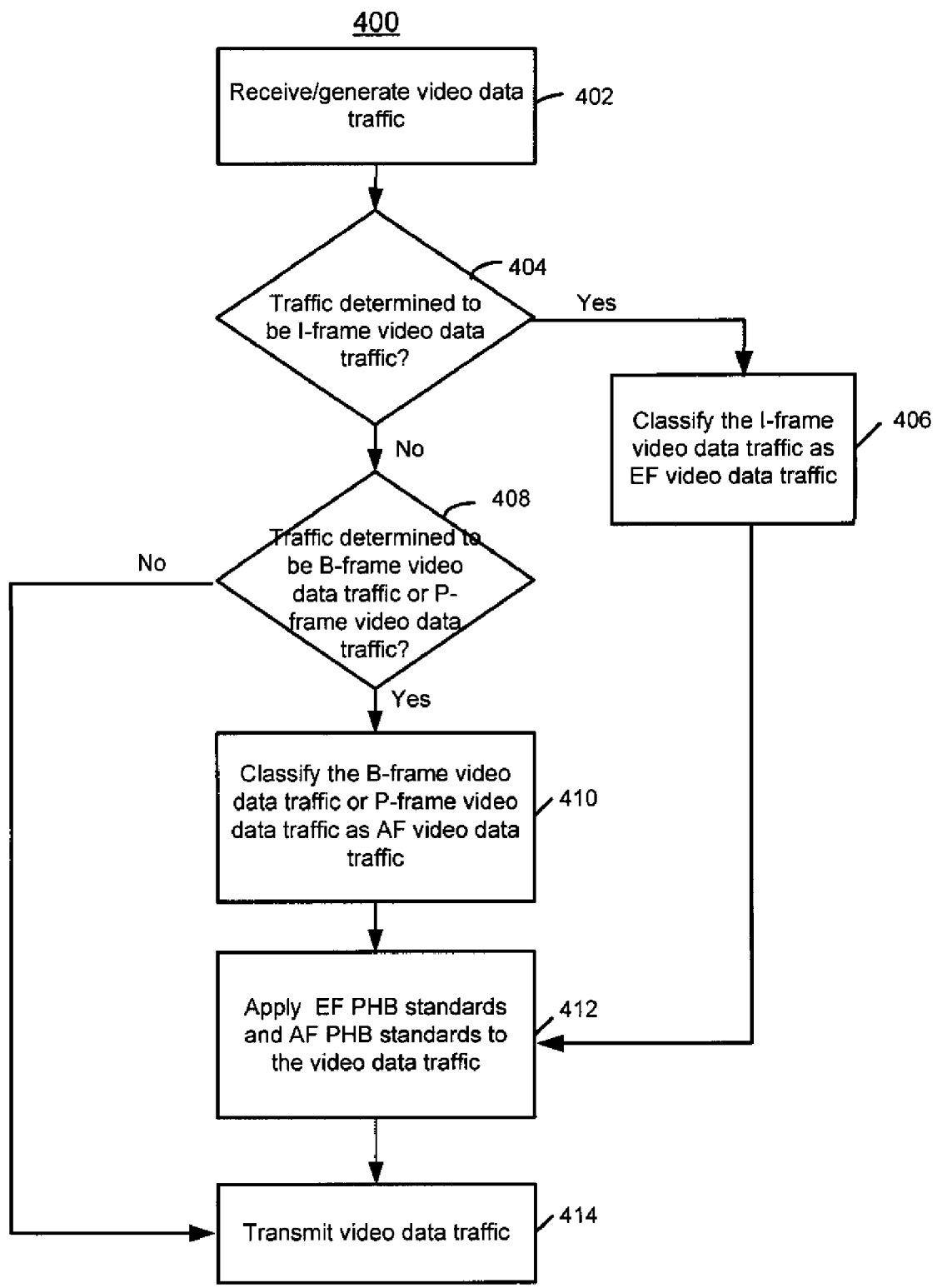
FIG. 4 illustrates a flowchart of a method for protecting video data traffic during transmission within an IP network in accordance with exemplary embodiments.

FIG. 4 illustrates a flowchart of a method 400 for protecting video data traffic during transmission within an IP network 106 in accordance with exemplary embodiments. This exemplary method is provided by way of example, as there are a variety of ways to carry out methods disclosed herein. The method 400 shown in FIG. 4 may be executed or otherwise performed by one or a combination of various systems. The method 400 is described below as carried out by the network 100 shown in FIG. 1 by way of example, and various elements of the network 100 are referenced in explaining the example method of FIG. 4. Each block shown in FIG. 4 represents one or more processes, methods, or subroutines carried in the exemplary method 400. Referring to FIG. 4, the exemplary method 400 may begin at block 402.

In block 402, the method 400 may include receiving and/or generating video data traffic. In an exemplary embodiment, the network 100 may receive and/or generate video data traffic using a video source device network element 102. The method 400 may continue to block 404.

In block 404, the method 400 may include determining whether the video data traffic is I-frame video data traffic. In an exemplary embodiment, determining whether the video data traffic is I-frame video data traffic may include accessing one or more bits associated with the header portion and/or the payload portion of the video data traffic using a video source device network element 102. If, for example, the video data traffic is determined to be I-frame video data traffic, the method 400 may classify the I-frame video data traffic as EF video data traffic using a video source classification module 202 in block 406. If, however, the video data traffic is not determined to be I-frame video data traffic, the method 400 may continue to block 408.

In block 408, the method 400 may include determining whether the video data traffic is B-frame video data traffic or P-frame video data traffic. In an exemplary embodiment, determining whether the video data traffic is B-frame video data traffic or P-frame video data traffic may include accessing one or more bits associated with the header portion and/or the payload portion of the video data traffic using a video source device network element 102. If, for example, the video data traffic is not determined to be B-frame video data traffic or P-frame video data traffic, the method 400 may continue to block 414. If, however, the video data traffic is determined to be B-frame video data traffic or P-frame video data traffic, the method 400 may continue to classify the B-frame video data traffic or P-frame video data traffic as AF video data traffic in block 410.

In block 410, the method 400 may include classifying the B-frame video data traffic or P-frame video data traffic as AF video data traffic. In an exemplary embodiment, the network 100 may classify the B-frame video data traffic or P-frame video data traffic as AF video data traffic using a video source classification module 202. The method 400 may continue to block 412.

In block 412, the method 400 may include applying EF PHB standards to EF video data traffic and applying AF PHB standards to AF video data traffic. It should be noted that this step may include configuring one or more network elements to apply EF PHB standards and AF PHB standards. In an exemplary embodiment, the one or more network elements associated with network 100 may be statically configured to apply EF PHB standards to EF video data traffic and apply AF PHB standards to AF video data traffic. In an exemplary embodiment, the one or more network elements associated with network 100 may be dynamically configured to apply EF PHB standards to EF video data traffic and apply AF PHB standards to AF video data traffic using a policy management network element (not shown). The method 400 may continue to block 414.

In block 414, the method 400 may include transmitting the video data traffic to the upstream portion of network 100. In an exemplary embodiment, the network 100 may transmit the video data traffic to the upstream portion of the network 100 using a video source communication module 204. The method 400 may then end.

Figure 5:
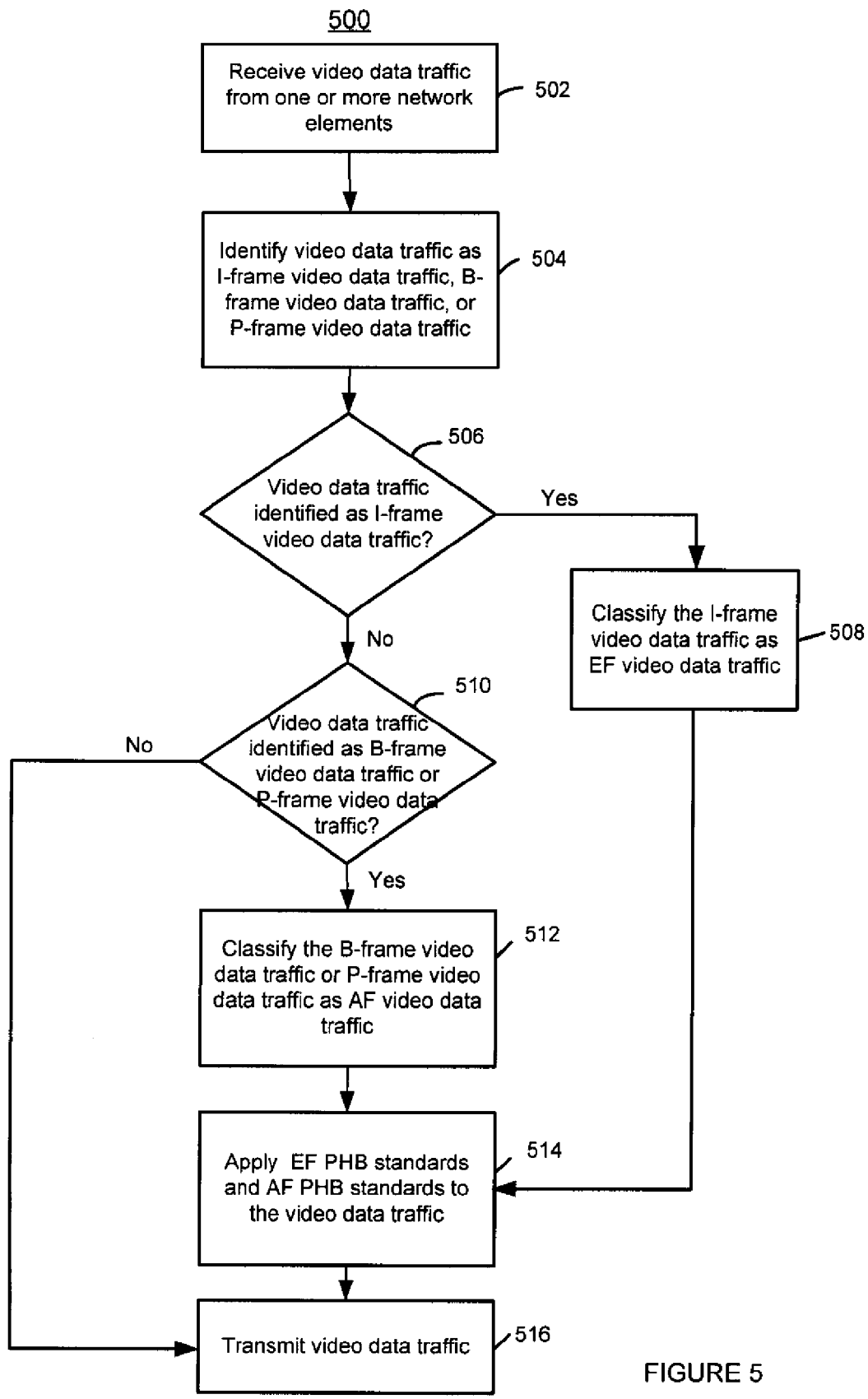
FIG. 5 illustrates a flowchart of another method for protecting video data traffic during transmission within an IP network in accordance with exemplary embodiments.

FIG. 5 illustrates a flowchart of another method 500 for protecting video data traffic during transmission within an IP network 106 in accordance with exemplary embodiments. This exemplary method is provided by way of example, as there are a variety of ways to carry out methods disclosed herein. The method 500 shown in FIG. 5 may be executed or otherwise performed by one or a combination of various systems. The method 500 is described below as carried out by the network 100 shown in FIG. 1 by way of example, and various elements of the network 100 are referenced in explaining the example method of FIG. 5. Each block shown in FIG. 5 represents one or more processes, methods, or subroutines carried in the exemplary method 500. Referring to FIG. 5, the exemplary method 500 may begin at block 502.

In block 502, the method 500 may include receiving video data traffic. In an exemplary embodiment, the receiving video data traffic may include receiving video data traffic at a network element communication module 306. The method 500 may continue to block 504.

In block 504, the method 500 may include identifying the video data traffic as I-frame video data traffic, B-frame video data traffic, or P-frame video data traffic. In an exemplary embodiment, identifying the video data traffic as I-frame video data traffic, B-frame video data traffic, or P-frame video data traffic may include a network element identification module 300 accessing one or more fields associated with the video data traffic to identify the type of frame associated with the video data traffic using an inspection mechanism (e.g., Deep Packet Inspection). The method 500 may continue to block 506.

In block 506, if, for example, the video data traffic is identified as I-frame video data traffic, the method 500 may classify the I-frame video data traffic as EF video data traffic using a network element classification module 302 in block 508. If, however, the video data traffic is not identified as I-frame video data traffic in block 506, the method 500 may continue to block 510.

In block 510, if, for example, the video data traffic is not identified as B-frame video data traffic or P-frame video data traffic, the method 500 may continue to block 516. If, however, the video data traffic identified as B-frame video data traffic or P-frame video data traffic in block 510, the method 500 may continue to classify the B-frame video data traffic or P-frame video data traffic as AF video data traffic in block 512.

In block 512, the method 500 may include classifying the B-frame video data traffic or P-frame video data traffic as AF video data traffic. In an exemplary embodiment, the network 100 may classify the B-frame video data traffic or P-frame video data traffic as AF video data traffic using a network element classification module 302. The method 500 may continue to block 514.

In block 514, the method 500 may include applying EF PHB standards to EF video data traffic and applying AF PHB standards to AF video data traffic. It should be noted that this step may include configuring one or more network elements to apply EF PHB standards and AF PHB standards. In an exemplary embodiment, the one or more network elements associated with network 100 may be statically configured to apply EF PHB standards to EF video data traffic and apply AF PHB standards to AF video data traffic. In an exemplary embodiment, the one or more network elements associated with network 100 may be dynamically configured to apply EF PHB standards to EF video data traffic and apply AF PUB standards to AF video data traffic using a policy management network element (not shown). The method 500 may continue to block 516.

In block 516, the method 500 may include transmitting the video data traffic to the upstream portion of network 100. In an exemplary embodiment, the network 100 may transmit the video data traffic to the upstream portion of the network 100 using a network element communication module 306. The method 500 may then end.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method comprising:
    identifying video data traffic as at least one of I-frame video data traffic, B-frame video data traffic, and P-frame video data traffic;
    classifying the video traffic based on the identification, wherein at least one frame of the video data traffic is classified as Expedited Forwarding (EF) video data traffic and at least a second frame of the video data traffic is classified as Assured Forwarding (AS) video data traffic;
    applying at least one of Expedited Forwarding (EF) standards and Assured Forwarding (AF) standards to the video data traffic based on the classification; and
    transmitting the video data traffic to one or more video receiver device network elements via one or more network elements using a network.

2. The method of claim 1, wherein identifying video data traffic comprises identifying video data traffic from a video source device network element.

3. The method of claim 1, wherein identifying video data traffic comprises identifying video data traffic from an ingress network element.

4. The method of claim 3, wherein identifying video data traffic at the ingress network element further comprises accessing one or more fields associated with the video data traffic.

5. The method of claim 1, wherein classifying the video data traffic further comprises classifying the I-frame video data traffic as Expedited Forwarding (EF) video data traffic.

6. The method of claim 1, wherein classifying the video data traffic further comprises classifying the B-frame video data traffic as Assured Forwarding (AF) video data traffic.

7. The method of claim 1, wherein classifying the video data traffic further comprises classifying the P-frame video data traffic as Assured Forwarding (AF) video data traffic.

8. The method of claim 1, wherein applying at least one of Expedited Forwarding (EF) standards and Assured Forwarding (AF) standards to the video data traffic further comprises configuring the one or more network elements to apply at least one of the Expedited Forwarding (EF) standards and the Assured Forwarding (AF) standards.

9. The method of claim 8, wherein configuring the one or more network elements comprises modifying one or more quality of service parameters associated with the one or more network elements.

10. The method of claim 1, wherein the video data traffic comprises Motion Picture Experts Group (MPEG) video data traffic.

11. The method of claim 1, wherein the network is associated with providing at least one of Internet Protocol television (IPtv) service and Video-On-Demand (VOD) service to the one or more video receiver device network elements.

12. A non-transitory computer readable medium storing an executable program comprising instructions to perform the method of claim 1.

13. A system comprising:
    a computer, comprising at least one computer processor and communicatively coupled to a computer network, comprising:
    an identification module operable to identify video data traffic as at least one of I-frame video data traffic, B-frame video data traffic, and P-frame video data traffic;
    a classification module operable to classify the video traffic based on the identification made by the identification module, wherein at least one of the video data traffic is classified as Expedited Forwarding (EF) video data traffic and at least a second frame of the video data traffic is classified as Assured Forwarding (AF) video data traffic;
    a service configuration module operable to apply at least one of Expedited Forwarding (EF) standards and Assured Forwarding (AF) standards to the video data traffic based on the classification made by the classification module; and
    a communication module operable to transmit the video data traffic to one or more video receiver device network elements via one or more network elements using a network.

14. The system of claim 13, wherein the identification module is further operable to identify the video data traffic from a video source device network element.

15. The system of claim 13, wherein the identification module is further operable to identify the video data traffic from an ingress network element.

16. The system of claim 13, wherein the classification module is further operable to classify the I-frame video data traffic as Expedited Forwarding (EF) video data traffic.

17. The system of claim 13, wherein the classification module is further operable to classify the B-frame video data traffic as Assured Forwarding (AF) video data traffic.

18. The system of claim 13, wherein the classification module is further operable to classify the P-frame video data traffic as Assured Forwarding (AF) video data traffic.

19. A method comprising:
   identifying video data traffic as at least one of I-frame video data traffic, B-frame video data traffic, and P-frame video data traffic;
   classifying the video data traffic based on the identification, wherein the classifying comprises at least one of classifying the I-frame video data traffic as Expedited Forwarding (EF) video data traffic, classifying the B-frame video data traffic as Assured Forwarding (AF) video data traffic, and classifying the P-frame video data traffic as Assured Forwarding (AF) video data traffic;
   applying at least one of Expedited Forwarding (EF) standards and Assured Forwarding (AF) standards to the video data traffic based on the classification; and
   transmitting the video data traffic to one or more video receiver device network elements via one or more network elements using a network.

20. A non-transitory computer readable medium storing an executable program comprising instructions to perform the method of claim 19.

* * * * *